(12) United States Patent
Hsu

(10) Patent No.: US 8,553,673 B2
(45) Date of Patent: Oct. 8, 2013

(54) METHOD OF FORMATTING DYNAMIC SCHEDULING INFORMATION AND RELATED COMMUNICATION DEVICE

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 290 days.

(21) Appl. No.: 12/894,174

(22) Filed: Sep. 30, 2010

(65) Prior Publication Data

US 2011/0080860 A1  Apr. 7, 2011

Related U.S. Application Data

(60) Provisional application No. 61/247,959, filed on Oct. 2, 2009.

(51) Int. Cl.
*H04J 3/24* (2006.01)

(52) U.S. Cl.
USPC ............................................ 370/349; 370/348

(58) Field of Classification Search
USPC .................... 370/322–330, 349, 312
See application file for complete search history.

(56) References Cited

U.S. PATENT DOCUMENTS

2011/0038296 A1* 2/2011 Yi et al. .......................... 370/312
2012/0044851 A1* 2/2012 Wang et al. .................... 370/312

OTHER PUBLICATIONS

3GPP TS 36.321 V9.0.0 (Sep. 2009) 3rd Generation Partnership Project; Technical Specification Group Radio Access Network; Evolved Universal Terrestrial Radio Access (E-UTRA) Medium Access Control (MAC) protocol specification (Release 9).
3GPP TS 36.331 V8.6.0 (Jun. 2009) 3rd Generation Partnership Project; Technical Specification Group Radio Access Network; Evolved Universal Terrestrial Radio Access (E-UTRA) Radio Resource Control (RRC); Protocol specification (Release 8).
3GPP TS 22.146 V9.0.0 (Jun. 2008) 3rd Generation Partnership Project; Technical Specification Group Services and System Aspects; Multimedia Broadcast/Multicast Service; Stage 1 (Release 9).
3GPP TS 36.300 V9.1.0 (Sep. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

* cited by examiner

*Primary Examiner* — Brenda H Pham
(74) *Attorney, Agent, or Firm* — Winston Hsu; Scott Margo

(57) ABSTRACT

A method of formatting dynamic scheduling information (DSI) for a mobile device in a wireless communication system is disclosed. The method includes the step of including a plurality of first tags in the DSI, each of the plurality of first tags corresponding to one of a plurality of multicast traffic channels (MTCHs) having a plurality of logical channel identifiers (LCIDs); and arranging the plurality of first tags in an order according to the LCIDs or a plurality of multicast control channels (MCCHs).

16 Claims, 7 Drawing Sheets

METHOD OF FORMATTING DYNAMIC SCHEDULING INFORMATION AND RELATED COMMUNICATION DEVICE

CROSS REFERENCE TO RELATED APPLICATIONS

This application claims the benefit of U.S. Provisional Application No. 61/247,959, filed on Oct. 2, 2009 and entitled "METHOD AND APPARATUS FOR DSI FORMAT OF MBMS IN A WIRELESS COMMUNICATIONS SYSTEM" the contents of which are incorporated herein.

BACKGROUND OF THE INVENTION

1. Field of the Invention

A method used in a wireless communication system and related communication device are provided, and more particularly to, a method of formatting dynamic scheduling information (DSI) for a mobile device in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A multimedia broadcast multicast service (MBMS) has been introduced in LTE specification. The MBMS gives the opportunity to broadcast TV, film, information such as free overnight transmission of newspaper in digital form and other media in these networks. The broadcast capability enables to reach unlimited number of users with constant network load. Further, it also enables the possibility to broadcast information simultaneously to many cellular subscribers. In a MBMS Single frequency network (MBSFN) area, a group of cells are coordinated for an MBSFN transmission and transmit the same content for the UEs.

In order to support the UE to receive MBMS data, the eNB provides the UE with information about MBSFN subframes used for MBMS control channel (MCCH), Multicast traffic channel (MTCH) and dynamic scheduling information (DSI). The MTCH is a point-to-multipoint downlink channel for transmitting data traffic from the network to the UE. The MCCH is a point-to-multipoint downlink channel used for transmitting MBMS control information from the network to the UE, for one or several MTCHs. The eNB performs multimedia access control (MAC)-level multiplexing for different MTCHs to be transmitted on a multicast channel (MCH). The MCH is used to transport user data and the control message. Both of the MCCH and the MTCH are mapped to the MCH. Multiple MBMS services can be transmitted using a single MTCH, provided that they use the same MBSFN area. One MCH can only contain data belonging to one MBSFN area; multiplexing between different MBSFN areas is not supported since MBSFN areas composed of different sets of cells would have different composite channel responses and need different channel estimations. It is most likely for several MBMS services to be transmitted on one MBSFN subframe, a logical channel identifier (LCID) included in a MAC header is used for the UE to identify the MBMS services of interest.

However, the MCHs transmitted over different MBSFN areas can be multiplexed in different MBSFN subframes. Within the MBSFN subframes, the transmission of a specific MCH occupies a pattern of MBSFN subframes, not necessarily adjacent in time, called the MCH Subframe Allocation Pattern (MSAP). The MSAP for every MCH carrying MTCH is signalled on MCCH. The MSAP occasion comprises the set of MBSFN subframes defined by the MSAP during a certain period. Within each MSAP occasion, additional signaling indicates the order in which the MTCHs are multiplexed.

The transmission order of MTCHs is signalled (implicitly or explicitly) in the MCCH. The dynamic scheduling information can be provided per MCH to indicate which subframes are used by each MTCH in the MSAP occasion.

It is possible that some of ongoing MBMS services are not scheduled or no data for transmission in current scheduling period. Therefore, DSI is necessary to indicate the scheduled MTCH (s) so that UE can correctly receive the interested services. Several candidate solutions are described as follows:

Alternative 1(A1): a bitmap+a list of start/stop tags for all scheduled MTCHs

Alternative 2 (A2): a list of {LCID, start/stop tags} for all scheduled MTCHs

Alternative 3(A3): a list of start/stop tags for all MTCHs, and using a special start/stop value to indicate unscheduled MTCHs Alternative 4 (A4): a toolbox" approach where (1 or 2-bit) flag is used to indicate which of above alternatives is used Where, the bitmap indicates scheduling status of all services listed in MCCH. In the bitmap, one bit associates with one service in MCCH. For example, "1" means scheduled service, and "0" means non-scheduled service. The real options are A1, A2 and A3. For A1 and A2, the relation between required bits and scheduled MTCHs is fixed. Since there is no bitmap or LCID list for A3, it is not clear how many bits are required.

SUMMARY OF THE INVENTION

A method of formatting dynamic scheduling information (DSI) in a wireless communication system is provided.

A method of formatting dynamic scheduling information (DSI) for a mobile device in a wireless communication system is disclosed. The method includes the step of including a plurality of first tags in the DSI, each of the plurality of first tags corresponding to one of a plurality of multicast traffic channels (MTCHs) having a plurality of logical channel identifiers (LCIDs); and arranging the plurality of first tags in an order according to the LCIDs or a plurality of multicast control channels (MCCHs).

A communication device for formatting dynamic scheduling information (DSI) in a wireless communication system is disclosed. The communication device comprising means for including a plurality of first tags in the DSI, each of the plurality of first tags corresponding to one of a plurality of multicast traffic channels (MTCHs) having a plurality of logical channel identifiers (LCIDs); and means for arranging the plurality of first tags in an order according to the LCIDs or a plurality of multicast control channels (MCCHs).

These and other objectives of the present disclosure will no doubt become obvious to those of ordinary skill in the art after reading the following detailed description of the preferred example that is illustrated in the various figures and drawings.

DETAILED DESCRIPTION

Figure 1:
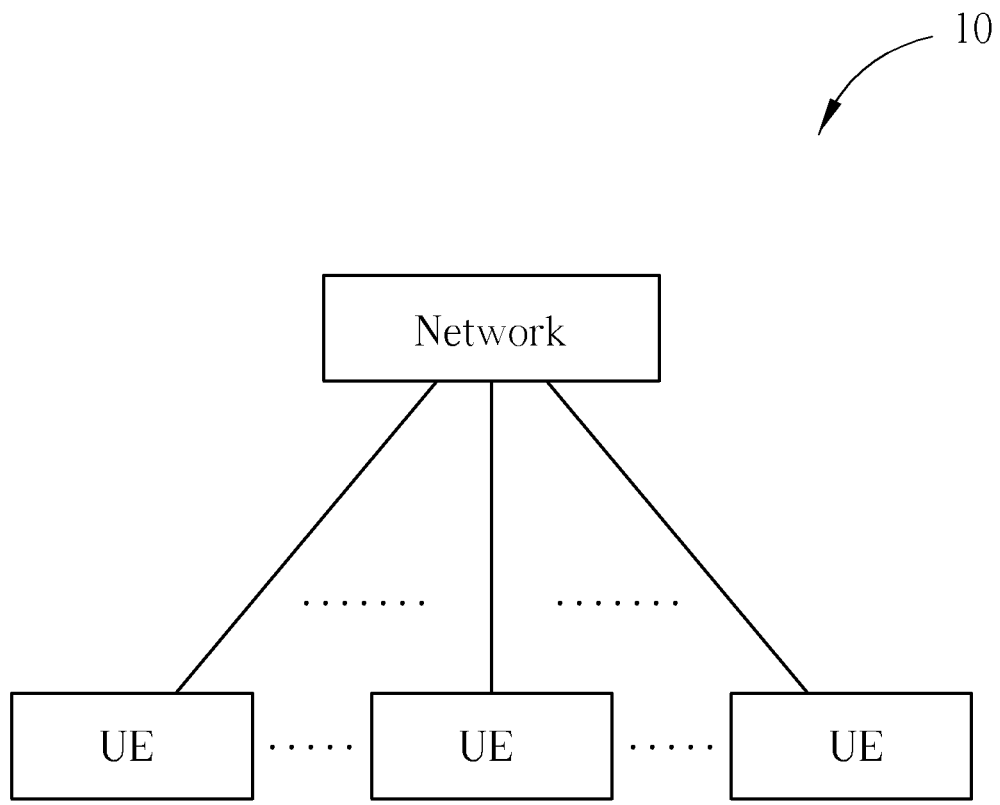
FIG. 1 is a schematic diagram of an exemplary wireless communication system.

Please refer to FIG. 1, which is a schematic diagram of an exemplary wireless communication system 10. The wireless communication system 10, such as an LTE (long-term evolution) system or other mobile communication systems, is briefly composed of a network and a plurality of user equipments (UEs). In FIG. 1, the network and the UEs are simply utilized for illustrating the structure of the wireless communication system 10. Practically, the network comprising a plurality of base stations, such as an E-UTRAN (evolved-UTAN) comprising a plurality of evolved Node-Bs (eNBs) in the LTE system. The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
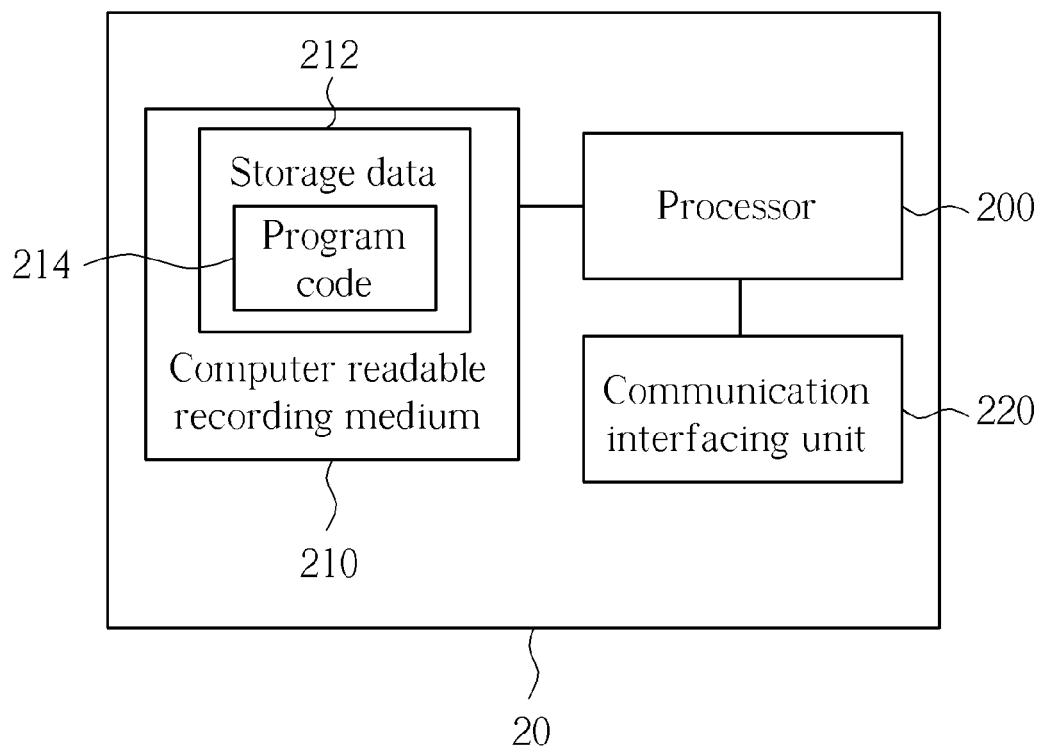
FIG. 2 is a schematic diagram of an exemplary communication device.

Please refer to FIG. 2, which is a schematic diagram of an exemplary communication device 20. The communication device 20 can be the UE or the network shown in FIG. 1 and includes a processor 200, a computer readable recording medium 210 and a communication interfacing unit 220. The computer readable recording medium 210 may be any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver for wirelessly communicating with other communication devices and can transform process results from the processor 200 into radio signals.

Figure 3:
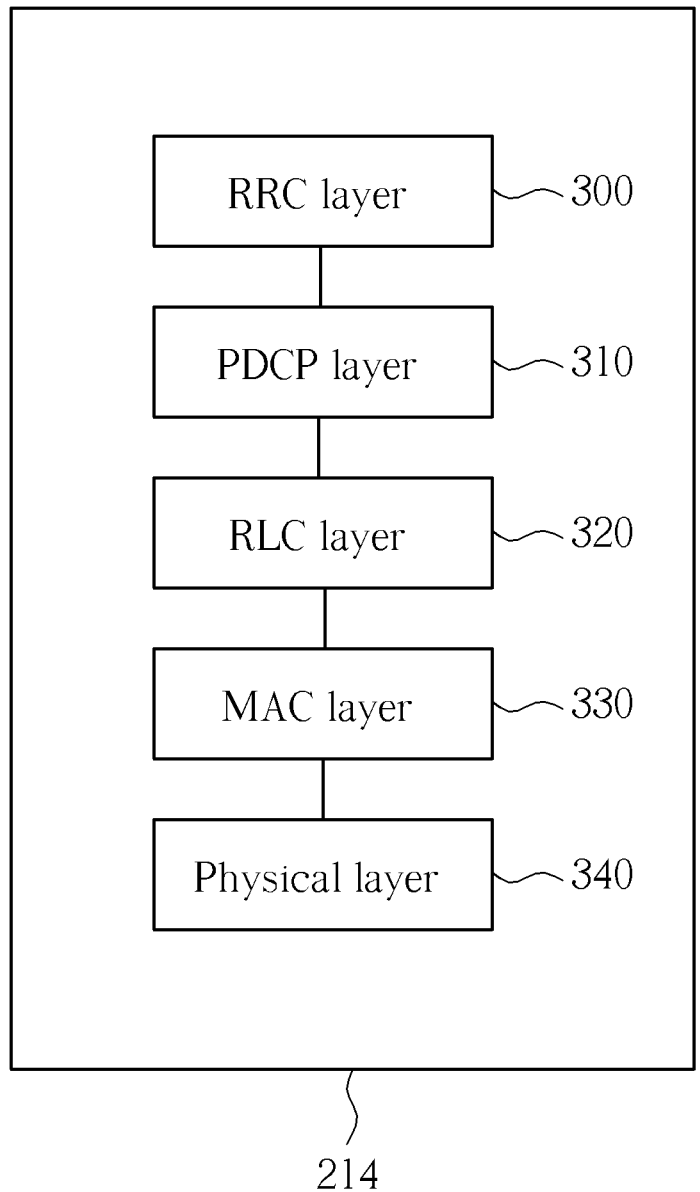
FIG. 3 illustrates a schematic diagram of the program code shown in FIG. 2.

Please refer to FIG. 3, which illustrates a schematic diagram of the program code 214 for the LTE system according to an example. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The MAC layer 330 may provide data transfer service for the RLC layer 320 through logical channels. The logical channels are either control logical channels which carry control data, or traffic logical channels which carry user plane data. Multicast control channels (MCCHs) are downlink channels which are used to transmit control information related to the reception of multimedia broadcast multicast service (MBMS) services. Multicast traffic channels (MTCHs) are used to transmit user data for the MBMS services in the downlink. Both of the MCCH and the MTCH are mapped to multicast channel (MCH). The UE may create a MAC protocol data unit (PDU) for transmission or receive a MAC PDU transmitted by an E-UTRAN. The MAC PDU primarily consists of the MAC header and the MAC payload. The MAC header is further composed of the MAC subheaders, while the MAC payload is composed of MAC control elements, MAC service data units (SDUs) and padding. Each MAC subheader consists of a logical channel identifier (LCID) field. The LCID uniquely identifies the individual channels within the MBMS services.

Figure 4:
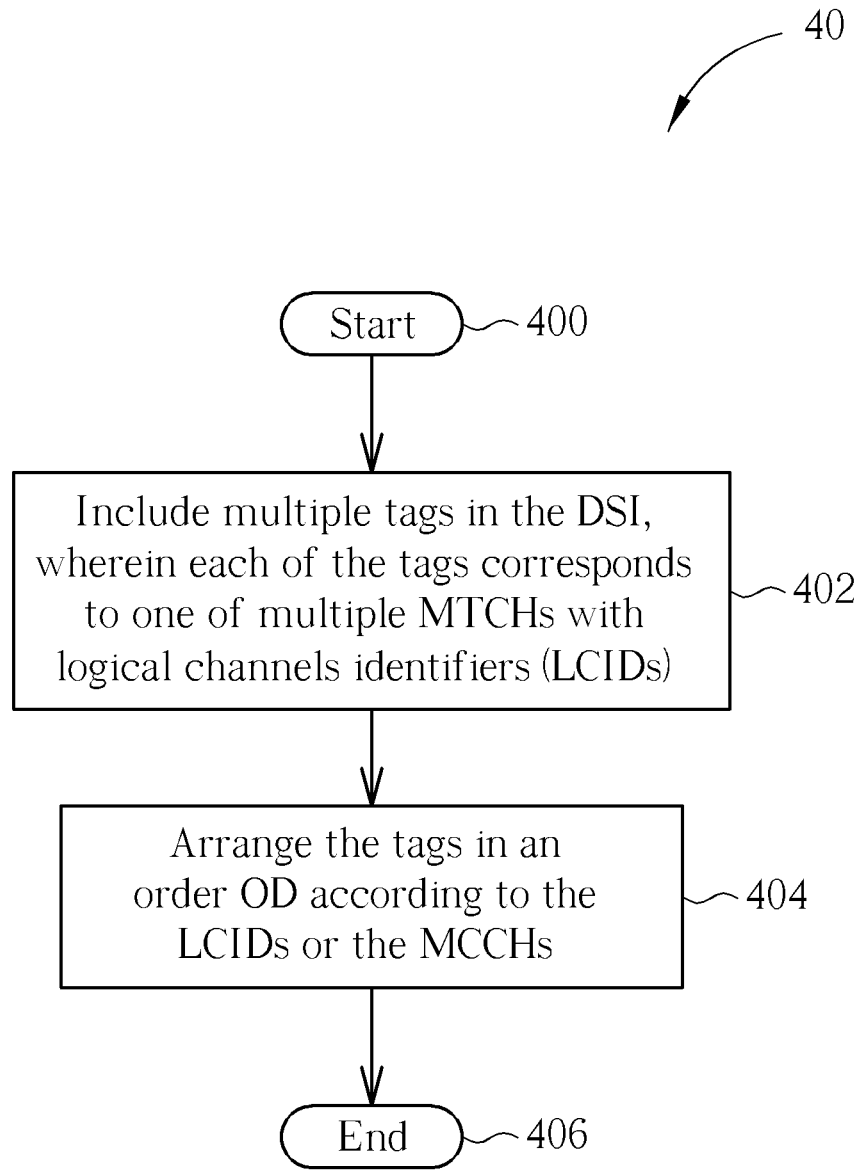
FIG. 4 is a flow chart of an exemplary process.

Please refer to FIG. 4, which is a flow chart of an exemplary process 40. The process 40 is used for formatting dynamic scheduling information (DSI) for a UE in a wireless communication system. The process 40 can be compiled into the program code 214 and include the following steps:

Step 400: Start.

Step 402: Include multiple tags in the DSI, wherein each of the tags corresponds to one of multiple MTCHs with logical channels identifiers (LCIDs).

Step 404: Arrange the tags in an order OD according to the LCIDs or the MCCHs.

Step 406: End.

According to the process 30, the tags are included in the DSI. The DSI is preferably a MAC control element, which indicates which subframes are used by each MTCH in a MCH Subframe Allocation Pattern (MSAP) occasion. The MSAP occasion comprises the set of subframes defined by the MSAP during a certain period. The tags may be referred as to Start/End tags. To format the DSI, the network arranges the tags in the order OD according to the LCIDs or the MCCHs. The order OD may be an ascending order of the LCIDs, a descending order of the LCIDs, or order used in the MCCHs.

Figure 5:
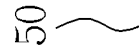
FIG. 5 illustrates an exemplary table.

The UE may receive multiple MBMS services simultaneously. For ongoing MBMS services, it is possible that some of MBMS services are not scheduled or no data for transmission in current scheduling period. The DSI is used to indicate scheduled MTCH(s) so that the UE can correctly receive the MBMS services of interest. According to the present disclosure, the MTCHs may be divided into two groups, a group G1 and a group G2. The MTCHs in the group G1 is scheduled for data transmission while the MTCHs in the group G2 is not scheduled for data transmission. Please refer to FIG. 5, which illustrates an exemplary table 50. In the table 50, MTCHs are denoted as M(l), l=1, 2, . . . , 10, where l represents the LCID of the MTCH. As seen in the table 50, the MTCHs M(1), M(2), M(3), M(5), M(6), M(7), M(8), M(9) and M(10) are assigned by the network, corresponding to ongoing MBMS services. A group G1 of the assigned MTCHs {M(2), M(5), M(6), M(7), M(8), M(9)} is scheduled for MBMS data transmission. A group G2 of the assigned MTCHs {M(1), M(3), M(10)} is unscheduled.

Figure 6:
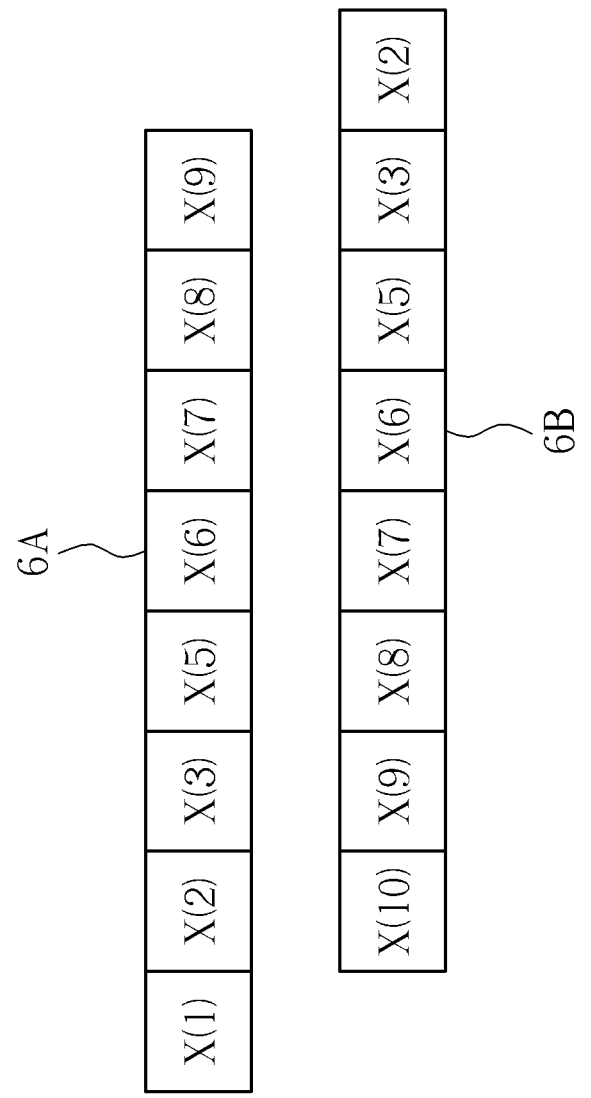
FIG. 6 illustrates exemplary formats of dynamic scheduling information according to the FIG. 5.

When the ascending order is adopted, the tags are arranged from the MTCH having the lowest LCID to the MTCH having the highest LCID in the group G1. If MTCHs in the group G2 have LCIDs higher than the highest LCID in the group G1, the UE skips their corresponding tags in the DSI. Please refer to FIG. 6, which is a format 6A of the DSI according to the FIG. 5. The MTCHs M(1), M(2), M(3), M(5), M(6), M(7), M(8), M(9) and M(10) correspond the tags X(1), X(2), X(3), X(5), X(6), X(7), X(8), X(9) and X(10), respectively. In the format 6A, the tags X(1), X(2), X(3), X(5), X(6), X(7), X(8), X(9) are arranged in the ascending order of the LCIDs. The tag X(1) corresponds to the MTCH M(1) with the lowest LCID. The tag X(9) corresponds to the MTCH M(9) with the highest LCID in the group G1. As seen in the format 6A, the MTCH M(10) having higher LCID than the MTCH M(9) is not arranged in the DSI because the MTCH M(10) is unscheduled. As a result, the tags X(2), X(5), X(6), X(7), X(8), X(9) may indicate the subframes used by MTCHs M(2), M(5), M(6), M(7), M(8), M(9) in the ascending order of LCID.

When the descending order is adopted, the tags are arranged from the MTCH having the highest LCID to the MTCH having the lowest LCID in the group G1. If MTCHs in the group G2 have LCIDs lower than the lowest in the group G1, the UE skips their corresponding tags in the DSI. Please refer to FIG. 6, which is a format 6B of the DSI according to the FIG. 5. The MTCHs M(1), M(2), M(3), M(5), M(6), M(7), M(8), M(9) and M(10) correspond the tags X(1), X(2), X(3), X(5), X(6), X(7), X(8), X(9) and X(10), respectively. In the format 6B, the tags X(2), X(3), X(5), X(6), X(7), X(8), X(9), X(10) are arranged in the descending order of the LCIDs. The tag X(10) corresponds to the MTCH M(10) with the highest LCID. The tag X(2) corresponds to the MTCH M(2) with the lowest LCIS in the group G1. As seen in the format 6B, the MTCH M(1) having lower LCID than the MTCH M(2) is not arranged in the DSI because the MTCH M(1) is unscheduled. As a result, the tags X(2), X(5), X(6), X(7), X(8), X(9) may indicate the subframes used by MTCHs M(2), M(5), M(6), M(7), M(8), M(9) in the descending order of the LCID.

Figure 7:
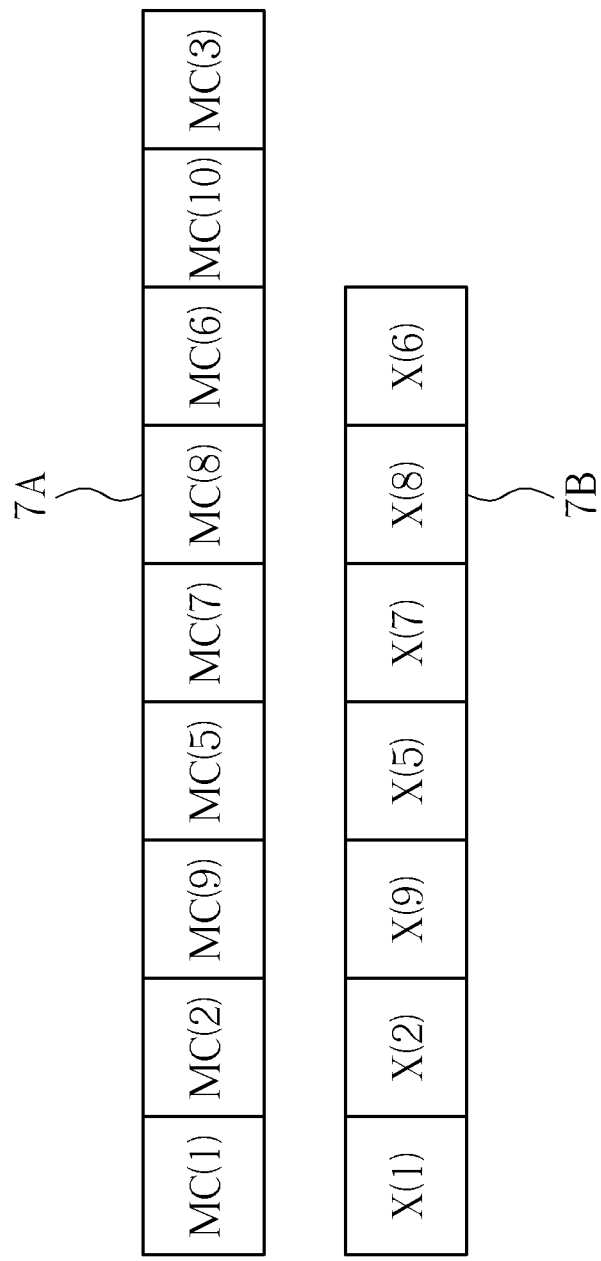
FIG. 7 illustrates an order of MCCH and an exemplary format of dynamic scheduling information according to FIG. 5.

When the order OD is based on the MCCHs, the tags X(1), X(2), . . . X(n) are arranged in the same order used in the MCCHs until all scheduled MTCH is arranged. Please refer to FIG. 7, which illustrates an order 7A of the MCCHs and a format 7B of the DSI according to FIG. 5. As seen in FIG. 7, the MCCHs are arranged in the order of {MC(1), MC(2), MC(9), MC(5), MC(7), MC(8), MC(6), MC(10), MC(3)}. Therefore, the tags in the DSI are arranged in the same order except the tag X(10) and the tag X(3), since their corresponding MTCHs M(10) and M(3) are not scheduled for MBMS data transmission.

To identify the unscheduled MTCHs (e.g. M(1), M(3) or M(10)), the UE may assign specific values to their corresponding tags (e.g. X(1), X(3) or X(10)) in the DSI. The specific values may be any invalid or unused value. For example, the maximal MBSFN subframe index is less than 192. Any value of great than 192 could be seen invalid and be used to indicate the unscheduled MTCH. When any tag in the DSI is found to exceed 192, the UE could know that its MTCH is unscheduled actually.

Since the length of the DSI is not fixed, the UE may include an indicator LI in the DSI, indicating the number of the tags. Preferably, the indicator could be 8 bits, followed by tags X(1), X(2), . . . , X(n). In some example, the UE may include another tag Yin the DSI as well. The tag Y is used for indicating a period during which the UE is able to receive unicast data on subframes. Namely, the UE may receive the unicast data on the subframes when those subframes are not used by the MBMS service.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20, in which the processor 200 processes the program code 214 related to the abovementioned processes and the processed results, can format DSI in a wireless communication system.

To sum up, the UE includes multiple tags in the DSI and arranges the tags in an order according to the LCIDs or MCCHs. Since the format of the DSI is specified according to examples of the present disclosure, this makes alternative 3 clearer and well-defined.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of formatting dynamic scheduling information (DSI) for a network device in a wireless communication system, the method comprising:
 including, via the network device, a plurality of first tags in the DSI, each of the plurality of first tags corresponding to one of a plurality of multicast traffic channels (MTCHs) having a plurality of logical channel identifiers (LCIDs); and
 arranging, via the network device, the plurality of first tags in an order according to the LCIDs or a plurality of multicast control channels (MCCHs).

2. The method of claim 1, wherein the plurality of MTCHs are divided into a first group and a second group, the MTCHs in the first group is scheduled for data transmission, and the MTCHs in the second group is not scheduled for data transmission.

3. The method of claim 1, wherein the order is an ascending order in which the plurality of first tags are arranged from the MTCH having a lowest LCID to the MTCH having a highest LCID.

4. The method of claim 1, wherein the order is a descending order in which the plurality of first tags are arranged from the MTCH having a highest LCID to the MTCH having a lowest LCID.

5. The method of claim 2, wherein the last first tag arranged in the order is in the first group when the plurality of first tags are arranged in the order according to the plurality of MCCHs.

6. The method of claim 2 further comprising assigning, via the network device a plurality of values to some of the plurality of first tags for identifying the MTCHs in the second group.

7. The method of claim 1 further comprising including, via the network device an indicator in the DSI, the indicator indicating the number of the plurality of first tags.

8. The method of claim 1 further comprising including, via the network device a second tag in the DSI, the second tag indicating a period during which a mobile device is able to receive unicast data on a Multi-Media Broadcast over a Single Frequency Network (MBSFN) subframe.

9. A communication device for formatting dynamic scheduling information (DSI) in a wireless communication system, the communication device comprising:
 a computer readable recording medium for storing program code corresponding to a process; and
 a processor coupled to the computer readable recording medium, for processing the program code to execute the process;
 wherein the process comprises:
  including a plurality of first tags in the DSI, each of the plurality of first tags corresponding to one of a plurality of multicast traffic channels (MTCHs) having a plurality of logical channel identifiers (LCIDs); and
  arranging the plurality of first tags in an order according to the LCIDs or a plurality of multicast control channels (MCCHs).

10. The communication device of claim 9, wherein the plurality of MTCHs are divided into a first group and a second group, the MTCHs in the first group is scheduled for data transmission, and the MTCHs in the second group is not scheduled for data transmission.

11. The communication device of claim 9, wherein the order is an ascending order in which the plurality of first tags are arranged from the MTCH having a lowest LCID to the MTCH having a highest LCID.

12. The communication device of claim 9, wherein the order is a descending order in which the plurality of first tags are arranged from the MTCH having a highest LCID to the MTCH having a lowest LCID.

13. The communication device of claim 10, wherein the last first tag arranged in the order is in the first group when the plurality of first tags are arranged in the order according to the plurality of MCCHs.

14. The communication device of claim 10, wherein the process further comprises assigning a plurality of values to some of the plurality of first tags for identifying the MTCHs in the second group.

15. The communication device of claim 9, wherein the process further comprises including an indicator in the DSI, the indicator indicating the number of the plurality of first tags.

16. The communication device of claim 9, wherein the process further comprises including a second tag in the DSI, the second tag indicating a period during which a mobile device is able to receive unicast data on a (Multi-Media Broadcast over a Single Frequency Network) MBSFN subframe.

* * * * *